Jan. 18, 1938.                 J. M. KUHLIK                 2,105,741
                               SOUND DEVICE
                            Filed June 30, 1936
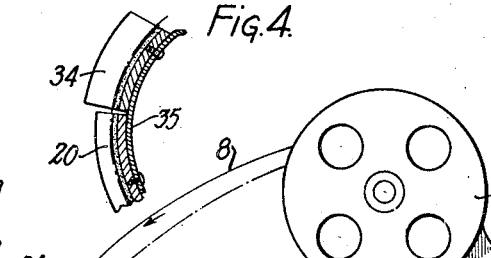
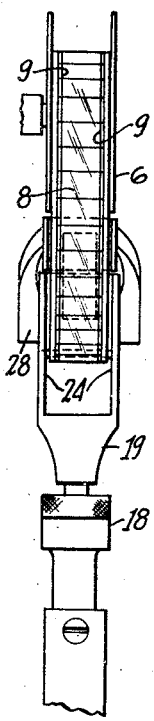
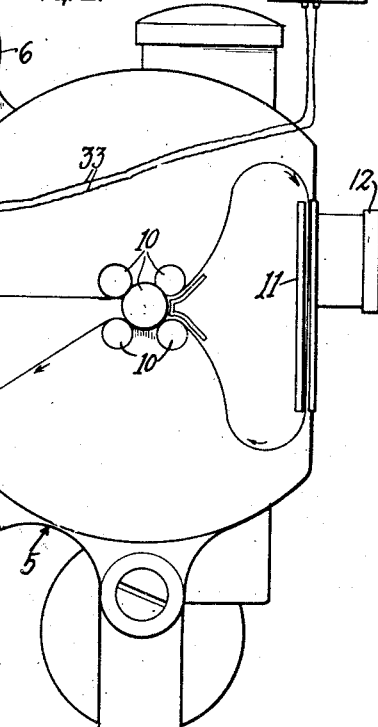
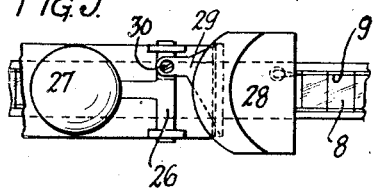
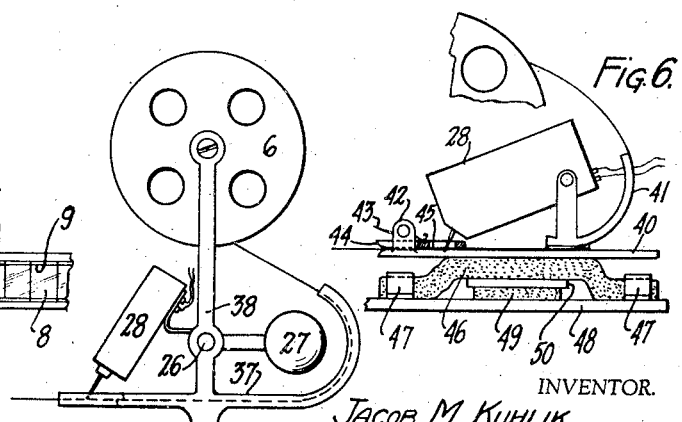
INVENTOR.
JACOB M. KUHLIK
BY
John J. Lynch
ATTORNEY.

Patented Jan. 18, 1938

2,105,741

UNITED STATES PATENT OFFICE 2,105,741

SOUND DEVICE

Jacob M. Kuhlik, Brooklyn, N. Y., assignor to Hattie B. Kuhlik, Kings County, N. Y.

Application June 30, 1936, Serial No. 88,140

8 Claims. (Cl. 274—11)

This invention relates to sound reproduction devices and in particular to one adapted for use with a motion-picture projector.

A particular object of the invention is to provide a unit through which film may be passed before being projected, so that sound on the sound track of said film may be reproduced in a suitable speaker or other audible device in synchronism with the pictures.

Particularly, my invention relates to a unit that is particularly adapted for use in connection with miniature projectors and may be used in the home to either first make a sound track on the film or reproduce sounds that have already been provided. While I am aware that devices of this nature are not novel, the invention contemplates a device which can be used as a unit either attached to the projector or mounted separately therefrom.

Objects of the invention include the mounting of the unit so that it swivels in all directions; is attachable or detachable to or from a projector or sound tape unit; the use of a yielding member which prevents breakage of the film; the use of a counterweight on the pickup so that its weight on the sound track of the film is relieved and digging in is prevented; the construction of the tape or film groove in the unit so that the placing of the pickup needle in the sound track is facilitated, and the mounting of the parts so that extraneous noises are eliminated and faithful reproduction is attained. A further and equally important object is to provide a device which can be adjusted while projection is going on for synchronizing sound and pictures.

With the foregoing and other objects in view, which will appear as the description proceeds, the invention resides in the combination and arrangement of parts and in the details of construction hereinafter described and claimed, it being understood that changes in the embodiment of the invention herein disclosed may be made within the scope of what is claimed without departing from the spirit of the invention.

In the accompanying drawing,

Figure 1 is a view in side elevation of a model moving picture projector having associated therewith in operative relation my improved sound unit, Figure 2 is a view in rear elevation of part of the sound or reproducing unit showing the film guiding trough therein, Figure 3 is a view taken on the line 3—3 of Figure 1 and shows the method of mounting the pick-up so that it may swing laterally to follow the sound track in the film, Figure 4 is an enlarged section taken through the film entrance end of the unit showing the spring end which yields to prevent breakage of the film as it passes into said unit, Figure 5 is a modified form of the invention in which is shown a film reel mounted directly thereon, and Figure 6 is a further modified form of the invention showing a rubber mounting for the unit for the purpose of dampening extraneous noises caused by vibration and other noises.

Referring to the drawing in detail, 5 indicates a motion picture projector of portable type having the usual feed and receiving reels 6 and 7 respectfully, between which passes a narrow band, tape or film 8 bearing a sound track 9. The film 8 passes about the usual driving rolls 10 and through the tracker 11 for projection through the lens 12, onto a suitable screen in the well known manner. The sound track on the film is formed in a well known manner which need not be described, it being sufficient to note that sound from the film track is picked up and is emitted from a loud speaker in synchronism with the subject matter of the film as projected.

Intermediate the feed or supply reel 6 and the driving rolls 10, I interpose my improved sound reproducing unit which consists of the base 13 which may be heavy enough to hold the unit steady or may be secured to a table or other support 14 at a point adjacent the projector 5 by any suitable clamping means indicated diagrammatically as at 15. The base 13 supports a tube 16 into which is adjustably fitted for sliding movement, an arm 17, carrying at its upper end a ball and socket terminal 18. To the ball portion is secured the film or tape guide head 19 the rear end of which is curved upwardly as at 20. The opposite end of the guide is provided with a shelf 21 which constitutes the offset continuation of the top 22 of the guide, the shelf and under side of the top being covered with felt 23 so that scratching or marring of the film is avoided and so that in the shelf portion of the device a resilient foundation is provided beneath the sound track whereby damage to the film by the needle of the pick-up is prevented. The sides 24 of the guide constitute guide means for the film and form a trough through which the film passes as it comes off the feed or supply spool.

Formed integrally with the sides of the guide, I provide the upstanding ears 25 between which is journalled or pivoted the shaft 26 to which is secured a ball counterweight 27, it being understood that any form of counterweight may be employed which is heavy enough to offset the major portion of the weight of a pick-up 28 pivotally supported from the shaft 26 by the plate bracket 29 which is secured to said shaft as at 30. The pick-up is of the usual form including the casing and pick-up needle 31 which engages in the sound groove of the film to translate the vibrations imparted thereto into audible sound in the loud speaker 32 with which the pick-up is connected by the usual wires 33.

The film as it is drawn into the guide sometimes becomes taut and if the tension thereon is not relieved, it will snap. In order to avoid this I provide on the curved end 20 of the guide, an auxiliary guide piece 34 secured to the guide 19 as by the spring 35. The auxiliary guide piece yields to an abnormal tension on the film and prevents breakage thereof.

My unit is adapted for use with any type of film picture projector and in order that it can be universally employed, the tube 16 and arm 17 may be retained in any relatively adjusted position through the medium of the screw 36. The ball and socket joint include a threaded sleeve through the medium of which the ball may be secured in any adjusted position relatively to the arm 17. The latter together with the tube and base constitutes an adjustable support. Through the ball and socket connection the guide may have any tilting movement and through the tube and arm may be raised or lowered as desired. Also, being separate from the projector it can be moved toward said projector or away from it in order to effectively and readily synchronize the sound with the projected picture. This is necessary in all sound devices, that are employed in conjunction with films but in the portable type of projector the use of complicated devices as now employed is objectionable and some means is preferable that can be adapted to any make of projector.

The unit may be modified in form by the construction shown in Figure 5 in which the guide trough member 37 is provided with oppositely disposed ears or brackets the same as shown in Figure 1 in which the pick-up and counterweight are mounted, but one of the brackets 38 is extended to provide a reel support 39 upon which the supply reel may be mounted, the film or tape therefrom being lead in the same way through the guide. In this connection it may be noted that the device may be employed in making the sound track on the new film, in which case the pick-up functions as a track cutter.

A further modification of the unit is illustrated in Figure 6 in which a base plate 40 is used, having an upturned extension 41 and forwardly disposed ears 42. Between the latter is yieldably held by a spring 43, the plate 44 in an opening 45 of which the needle of the pick-up reposes on the film. The pick up is mounted so that extraneous noises are not transmitted by vibration of the moving parts to the pick-up and this is accomplished by mounting the plate 40 on a sponge rubber pad 46 secured by straps 47 to a support 48 and further cushioned at its center by an auxiliary rubber pad 49 and an interposed disk or plate member 50.

It is evident therefore that I have provided a sound unit which may be used with a portable or other film projector and which can be adjusted relatively thereto to synchronize the sound with the projected matter and one which is adapted for use with any make of projector. In the form shown in Figure 6 the support 48 may be secured in any manner to the projector and the form illustrated in Figures 1 and 5 may also be used directly on the projector, but I prefer to mount the unit separately so that ease of adjustment and its adaptability enhance its usefulness. The plate-bracket 29 that supports the pick-up 28 may be of spring steel so that in using a light pick-up unit the pressure of said unit on the sound track of the film will be sufficient, in which instance the counterweight may be dispensed with.

The use of the word pick-up throughout the specification and claims is intended to mean a device in which sound is picked up from an outside source and impressed on the film or sound is picked up from the film sound track, the device constituting a recorder or reproducer.

While I have illustrated and described my invention with some degree of particularity, I realize that in practice various alterations therein may be made without departing from the scope of the claims or spirit of the invention.

What I claim is:

1. A sound unit arranged for use with a motion picture projector comprising a support, a guide head mounted for universal movement on said support and said guide head having a passage therethrough for a film, a sound pick-up pivotally mounted in said unit and engaging the sound track of the film as the latter moves through said passage and a counterbalance on the pick-up for controlling the pressure of said pick-up on the film.

2. A sound unit arranged for use with a picture projector comprising a support, a guide head mounted for universal movement on said support and said guide head having a guide passage therethrough in which the film travels before projection, said guide head passage including a yieldable portion arranged to be engaged by the film and to yield therewith when the film is abnormally tensioned, a sound recorder or reproducer pivotally mounted on the device for engaging the sound track of the film and a counterweight for controlling the pressure of the recorder or reproducer on the film.

3. A sound unit arranged for use with a motion picture projector comprising a support, a guide head mounted for universal movement on said support and said guide head having a guide passage therein and through which a film travels before projection, a shaft pivotally mounted on said guide head, a recorder or reproducer and counterweight attached to said shaft, and the recorder or reproducer being arranged to engage the sound track of a film passing through the guide passage.

4. A sound device for use with moving picture projectors including a guide having a face lined with soft material, said guide constituting a passageway for a film before projection, a shelf in the guide over which the film passes, a sound recorder or reproducer arranged for contact with a sound track of said film, means for mounting the recorder or reproducer for vertical and horizontal swinging movement, a counterweight on the recorder or reproducer and part of said guide being yieldable under tension influence of the film.

5. A sound unit comprising a guide member having sides and a top and constituting a passageway for a film, one end of the top being curved upwardly and the opposite end being formed to provide a shelf, a resilient covering for the under surface of said top and upper surface of said shelf over which the film travels, a pick-up, means for pivotally mounting the pick-up in the guide member for contact with a sound track on the film, and a counterweight for said pick-up.

6. A sound unit as set forth in claim 5 including a base for the guide member, telescopic means for adjusting the height of the guide relatively to the base, and a pivotal connection between said telescopic means and the guide whereby the latter can be adjusted in any direction.

7. A sound device comprising a guide member constituting a passage for a tape or band member, a sound translating unit mounted in the guide for engagement with the tape, a counterweight for the unit means for pivotally supporting said unit and counterweight in the guide including an upright and a reel for the tape mounted for rotation in said upright.

8. A sound device comprising a guide member constituting a passage for a film and having an upturned portion, a sound translating unit pivotally mounted on said guide member, said guide including a plate, a base and a resilient pad interposed between said plate and base for absorbing extraneous sounds, a film plate yieldably resting on said film and having an opening into which a part of the sound translating unit extends to engage the film.

JACOB M. KUHLIK.